US012769087B2

(12) United States Patent
Kim et al.

(10) Patent No.: US 12,769,087 B2
(45) Date of Patent: Oct. 20, 2026

(54) ACTUATOR FOR CAMERA

(71) Applicant: JAHWA electronics Co., Ltd., Chungcheongbuk-do (KR)

(72) Inventors: Hee Seung Kim, Seoul (KR); Kyu Min Lee, Gyeonggi-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 137 days.

(21) Appl. No.: 18/860,141

(22) PCT Filed: Mar. 14, 2023

(86) PCT No.: PCT/KR2023/003406
§ 371 (c)(1),
(2) Date: Oct. 25, 2024

(87) PCT Pub. No.: WO2023/219250
PCT Pub. Date: Nov. 16, 2023

(65) Prior Publication Data

US 2026/0186235 A1 Jul. 2, 2026

(30) Foreign Application Priority Data

May 9, 2022 (KR) ........................ 10-2022-0056538

(51) Int. Cl.
*G02B 7/09* (2021.01)
*G02B 7/02* (2021.01)
(Continued)

(52) U.S. Cl.
CPC ............... *G02B 7/09* (2013.01); *G02B 7/023* (2013.01); *G03B 13/36* (2013.01); *H04N 23/54* (2023.01);
(Continued)

(58) Field of Classification Search
CPC .......... G02B 7/09; G02B 7/023; H04N 23/54; H04N 23/57; H04N 23/55; G03B 13/36; G03B 2205/0046; G03B 2205/0069
(Continued)

(56) References Cited

U.S. PATENT DOCUMENTS

2019/0230262 A1* 7/2019 Wang .................... F03G 7/0614
2020/0137274 A1* 4/2020 Lee ........................ G03B 17/17
(Continued)

FOREIGN PATENT DOCUMENTS

JP 2011-039481 A 2/2011
JP 6152386 B2 6/2017
(Continued)

OTHER PUBLICATIONS

International Search Report for PCT/KR2023/003406 mailed on Jun. 19, 2023.

(Continued)

*Primary Examiner* — Sharrief I Broome
(74) *Attorney, Agent, or Firm* — The PL Law Group, PLLC

(57) ABSTRACT

An actuator for a camera includes a carrier having a lens mounted thereon and moving in an optical axis direction, a housing accommodating the carrier, a driving magnet provided in the carrier, a coil provided in the housing and facing a side portion of the driving magnet, a ball arranged between a lower portion of the carrier and the housing, and a reinforcing member coupled to the housing and generating an attractive force with the driving magnet. The reinforcing member includes a body portion coupled to a lower portion of the housing and a flange portion protruding upward from the body portion toward the driving magnet.

6 Claims, 8 Drawing Sheets

(51) Int. Cl.

| | |
|---|---|
| ***G03B 13/36*** | (2021.01) |
| ***H04N 23/54*** | (2023.01) |
| ***H04N 23/55*** | (2023.01) |
| ***H04N 23/57*** | (2023.01) |

(52) U.S. Cl.
CPC ............. *H04N 23/55* (2023.01); *H04N 23/57* (2023.01); *G03B 2205/0046* (2013.01); *G03B 2205/0069* (2013.01)

(58) Field of Classification Search
USPC .......................................................... 359/824
See application file for complete search history.

(56) References Cited

U.S. PATENT DOCUMENTS

| | | | | |
|---|---|---|---|---|
| 2020/0333622 | A1* | 10/2020 | Fujisaki ................. | G03B 17/17 |
| 2020/0333686 | A1* | 10/2020 | Kim ....................... | G03B 30/00 |
| 2022/0291475 | A1* | 9/2022 | Kim ..................... | G02B 13/009 |

FOREIGN PATENT DOCUMENTS

| | | | |
|---|---|---|---|
| KR | 10-2019-0092803 | A | 8/2019 |
| KR | 10-2020-0133703 | A | 11/2020 |
| WO | WO 2015/133731 | A1 | 9/2015 |
| WO | WO 2020/218746 | A1 | 10/2020 |

OTHER PUBLICATIONS

Office action issued on Jun. 18, 2026 from Korean Patent Office in a counterpart Korean Patent Application No. 10-2022-0056538 (all the cited references are listed in this IDS.) (English translation is also submitted herewith.).

* cited by examiner

ACTUATOR FOR CAMERA

BACKGROUND

1. Technical Field

The present disclosure relates to an actuator for a camera, and more specifically, to an actuator for a camera having improved driving performance by structurally improving a reinforcing member to generate an attractive force with a driving magnet.

2. Background Art

Advances in hardware technology for image processing and growing consumer need for making and taking photos and videos have driven implementation of such functions as autofocusing (AF) and optical image stabilization (OIS) in stand-alone cameras as well as camera modules mounted on mobile terminals including cellular phones and smartphones.

Recently, actuators for zoom driving that may vary the size of a subject, etc., through zoom-in and zoom-out functions have been disclosed, and, depending on an embodiment, actuators that implement AF or/and zoom functions in a more diverse manner by combinatorially applying the mutual positional relationship of a plurality of lenses (lens assemblies) have also been disclosed.

In the case of such actuators for driving zoom, since the travel distance (also referred to as the stroke) of a zoom lens moving in the optical axis direction is longer or expanded than that of a general lens, the actuator must be designed to secure driving power to that extent. Also, since the travel distance of the carrier (where the lens is mounted) is longer, the actuator must be designed to maintain the linearity of the movement more precisely throughout the entire travel section.

In the case of a conventional zoom-driving actuator, a magnet equipped on a carrier serving as a moving body and a coil equipped on a housing (base, etc.) serving as a fixed body are arranged to face each other based on the side surface of the carrier.

In addition, in the case of a conventional actuator, a ball that induces linear movement of the carrier and a rail structure that guides the ball may be placed between the carrier and the bottom surface of the housing. In this case, a yoke provided in the lower portion of the housing to maintain contact force between the carrier and the housing with the ball interposed therebetween, and a suction magnet that generates an attractive force are provided on the lower portion of the carrier.

If the suction magnet is arranged on a surface that is perpendicular to the surface equipped with the driving magnet in this way, there may be an advantage of avoiding magnetic interference through an orthogonal relationship, but there may be problems in that driving efficiency deteriorates since the weight of the carrier is increased, and furthermore, the thickness of the actuator inevitably increases since additional space must be secured for installing the suction magnet.

In particular, in the case of a zoom-driving actuator, the linearity of the movement must be maintained more precisely over the entire travel section of the carrier, so a relatively large suction magnet, such as one having a shape extending in the optical axis direction, must be provided, and thus the above problems may be further aggravated.

SUMMARY

Other technical goals and advantages of the present invention can be understood with reference to the description below, which will be made explicit by the accompanied examples. Furthermore, the technical goals and advantages of the present invention can be accomplished by the embodiments and their combinations recited in the attached claims.

The present disclosure is designed to solve the problems of the related art, and therefore the present disclosure is directed to providing an actuator for a camera in which the spatial utilization of the actuator may be implemented more effectively, and also the contact force between a carrier a the housing with a ball interposed therebetween may be continuously maintained through structural improvement of essential components equipped in the actuator without adding additional components such as a conventional suction magnet.

In one aspect of the present disclosure, there is provided an actuator for a camera, including: a carrier having a lens mounted thereon and moving in an optical axis direction; a housing accommodating the carrier; a driving magnet provided in the carrier; a coil provided in the housing and facing a side portion of the driving magnet; a ball arranged between a lower portion of the carrier and the housing; and a reinforcing member coupled to the housing and generating an attractive force with the driving magnet, wherein the reinforcing member includes a body portion coupled to a lower portion of the housing; and a flange portion protruding upward from the body portion toward the driving magnet.

Here, the flange portion of the present disclosure is preferably configured to have a shape in which a surface portion thereof protruding and bending upward from the body portion to face a lower surface of the driving magnet extends in the optical axis direction.

Depending on the embodiment, the actuator for a camera of the present disclosure may further include a second carrier having a lens mounted thereon and moving in the optical axis direction; a second driving magnet provided on the second carrier; a balance magnet provided on a lower portion of the second carrier, the balance magnet being provided on the lower portion at an opposite side where the second driving magnet is provided; a second coil provided in the housing and facing a side portion of the second driving magnet; and a second ball arranged between the lower portion of the second carrier and the housing.

In this case, the reinforcing member of the present disclosure is preferably configured to include a second flange portion protruding upward from the body portion toward the balance magnet.

Here, the flange portion of the present disclosure is preferably configured to have a shape in which a surface portion thereof protruding and bending upward from the body portion to face a lower surface of the driving magnet extends in the optical axis direction.

Also, the second flange portion of the present disclosure is preferably configured to have a shape in which a surface portion thereof protruding and bending upward from the body portion to face a lower surface of the balance magnet extends in the optical axis direction parallel to the flange portion.

To implement a more preferred embodiment, the flange portion and the second flange portion of the present disclosure may be configured to have different heights relative to a direction perpendicular to an optical axis.

In addition, the housing of the present disclosure may include a guiding rail on which the ball is guided or a second guiding rail on which the second ball is guided, and in this case, the guiding rail or the second guiding rail of the present disclosure may be formed in a space between the flange portion and the second flange portion.

According to a preferred embodiment of the present disclosure, by implementing an attractive force structure between a carrier and a housing through structural improvement of essential components provided in the actuator without adding any other additional components, the overall thickness of the actuator itself may be reduced, thereby further optimizing device miniaturization and space utilization.

In addition, according to one embodiment of the present disclosure, since the conventional suction magnet itself may be omitted, the driving efficiency based on the weight reduction of the carrier itself may be improved. Also, since the process for mounting the suction magnet, etc. may be omitted, the efficiency of the assembly process may be further improved.

Furthermore, in the present disclosure, even in an actuator equipped with multiple carriers, the attractive force distribution and balance between each carrier and the housing may be effectively implemented through structural improvement in which the components are organically combined together, thereby improving the operating precision of the entire travel section of each carrier.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
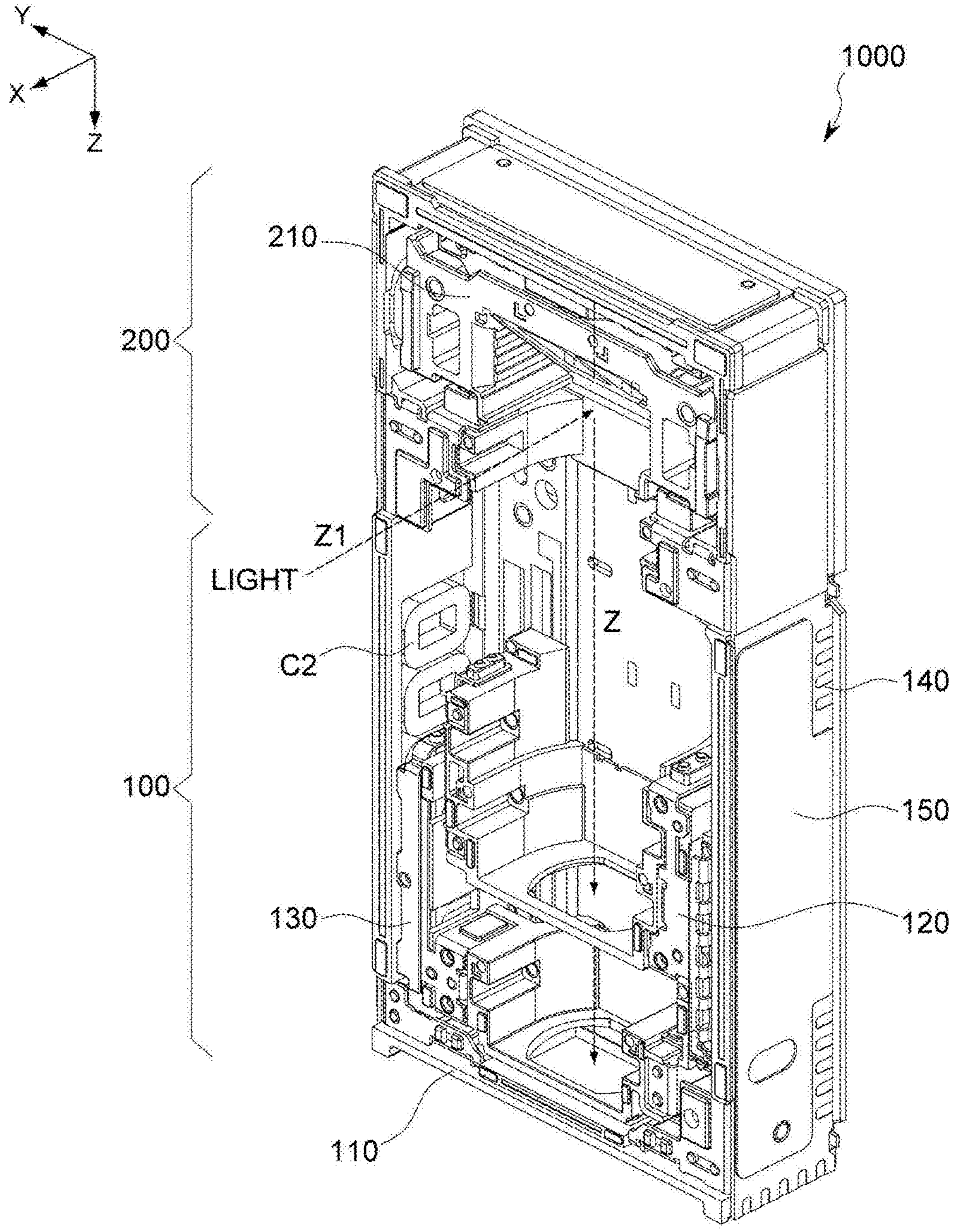
FIG. 1 is a drawing showing the overall configuration of an actuator for a camera and a camera module according to a preferred embodiment of the present disclosure.

FIG. 1 is a drawing showing the overall configuration of an actuator for a camera (hereinafter referred to as "actuator") 100 and a camera module 1000 according to a preferred embodiment of the present disclosure.

The actuator 100 of the present disclosure may be implemented as a single device in itself, of course, and may also be implemented as a camera module 1000 including a reflector module 200, as shown in FIG. 1.

The actuator 100 of the present disclosure corresponds to an actuator that implements functions such as auto focus (AF) or zoom (zoom, continuous zoom) by linearly moving a carrier equipped with a lens (lens assembly) in the optical axis direction (Z-axis direction based on the drawing).

The reflector module 200, which may be provided on the upper portion of the actuator 100 (based on the optical axis direction of FIG. 1) according to the present disclosure, performs the function of reflecting or refracting a light path ZI of a subject to a path toward the lens (Z, optical axis direction). The light reflected or refracted to the optical axis direction in this way passes through the lens (lens assembly) (not shown) provided in the carrier 120 and is introduced to an image sensor (not shown) such as a CMOS or CCD.

The reflector module 200 for changing the path of light may include a reflector that may be formed by one selected from a mirror or a prism, or a combination thereof. This reflector is a configuration installed on the support frame 210, and may be implemented by various members that may change the path of light coming from the outside into an optical axis direction, but it is preferable that the reflector module 200 is made of a glass material in order to improve optical performance.

The camera module 1000 of the present disclosure, which includes the reflector module 200, is configured to refract the path of light so that light enters toward the lens. Thus, the device itself may be installed in the length direction of a mobile terminal (such as a smartphone) rather than in the thickness direction, thereby not increasing the thickness of the mobile terminal. Thus, the camera module 1000 may be optimized for miniaturization or slimming of a mobile terminal.

According to an embodiment, the support frame 210 on which the reflector is installed may be configured to rotate by a driving means that generates a magnetic force, such as a magnet and a third coil C3 (see FIG. 2), and by a position detection sensor H3.

If the support frame 210, specifically the reflector installed on the support frame 210, moves or rotates in this way, the light of the subject reflected (refracted) through the reflector moves in the ±Y direction and/or ±X direction. Thus, stabilization in the X-axis and/or Y-axis direction for hand shaking, etc. may be implemented.

The light of the subject reflected through the reflector module 200 is incident on one or more lenses mounted on at least one carrier 120, 130 that moves linearly based on the optical axis direction (Z-axis), and the positions of one or more lenses (based on the optical axis direction) are combinatorially adjusted by the actuator 100 of the present disclosure to implement functions such as zoom or AF.

The drawing shows two carriers 120, 130 moving in the optical axis direction with respect to the housing 11 serving as a relatively fixed body, but this is only an example, and a different number of carriers may be provided, and a fixed lens may be provided in the housing 110 depending on optical specifications or performance.

In the following explanation of the present disclosure, the directional axis corresponding to the path through which light enters a lens, etc., is defined as an optical axis (Z-axis), and the two axes perpendicular to the optical axis (Z-axis) are defined as X-axis and Y-axis.

Figure 2:
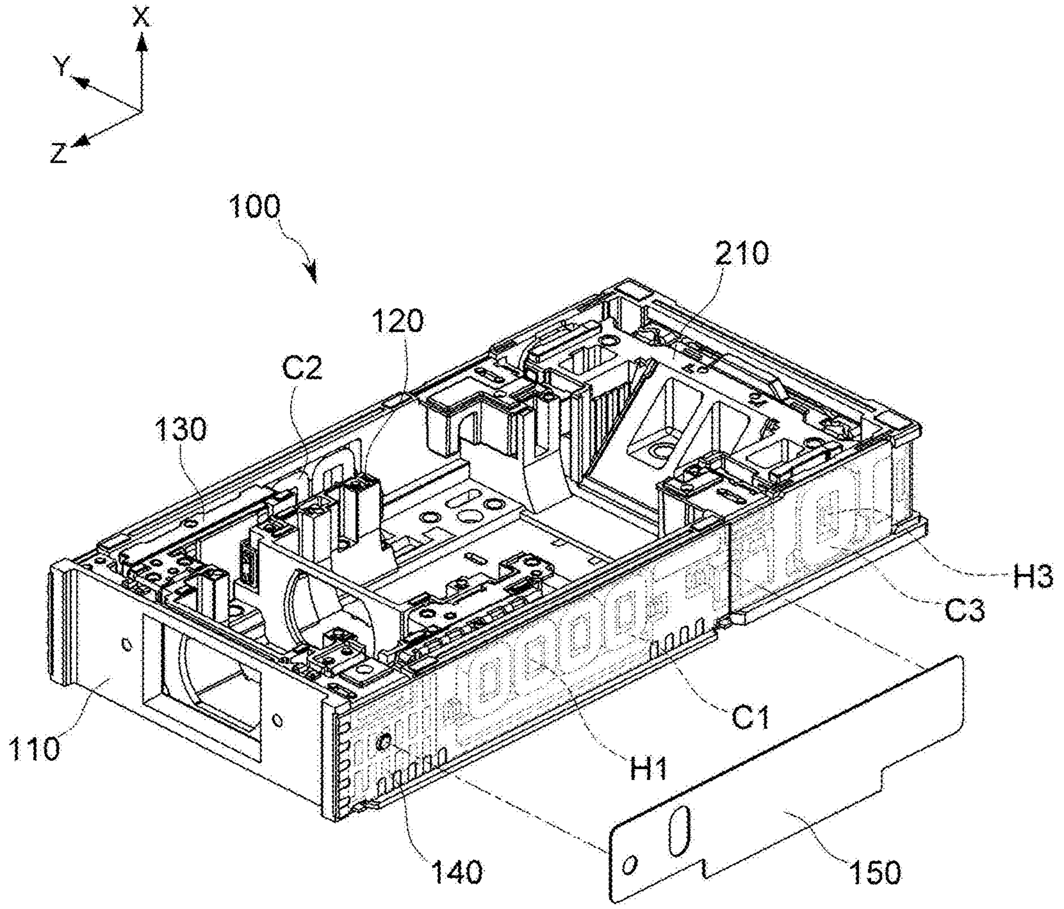
FIG. 2 is a drawing showing the overall configuration of the actuator according to a preferred embodiment of the present disclosure.

FIG. 2 is a drawing showing the overall configuration of the actuator 100 according to a preferred embodiment of the present disclosure.

As illustrated in FIG. 2, the actuator 100 of the present disclosure may include a housing 110 that corresponds to the basic frame structure of the actuator 100 and accommodates the internal configuration, a carrier 120, a driving magnet M1 (see FIG. 3, etc.) provided in the carrier 120, a hall sensor H1, and a coil C1.

The carrier 120 has a space in which at least one lens is mounted, and corresponds to a moving body that moves linearly based on the optical axis direction (Z-axis direction). In a corresponding relative viewpoint, the housing 110 corresponds to a fixed body.

As described below, the carrier 120 includes a driving magnet M1, and the coil C1 that faces the driving magnet M1 and provides driving force to the driving magnet M1 is disposed in the housing 110. In order to correspond to the extended operating range (stroke) of the carrier 120, the coil C1 is preferably implemented as a plurality of coils arranged vertically along the optical axis direction as illustrated in the drawing.

When power of an appropriate magnitude and direction is applied to the coil C1 under the control of an operation driver (not shown), an electromagnetic force is generated between the coil C1 and the driving magnet M1, and the carrier 120 moves forward and backward in the optical axis direction by this generated electromagnetic force.

If the carrier 120 moves linearly in the optical axis direction in this way, the lens mounted on the carrier also moves linearly in the optical axis direction, so functions such as AF or zoom are implemented depending on the relative positional relationship of the lenses.

To prevent the electromagnetic force generated in the coil C1 from leaking to the outside and to concentrate it more toward the magnet M1, a yoke plate 150 made of metal may be provided on the opposite side of the coil C1 facing the magnet M1.

The hall sensor H1 uses the Hall Effect to detect the magnitude and direction of the magnetic field generated from the opposing magnet M1 and outputs a corresponding signal to the operation driver.

The operation driver processes the signal input from the Hall sensor H1 and controls the power to be applied to the coil C1 in a magnitude and direction corresponding to the result.

It is desirable that the detection of the hall sensor H1 and the control processing of the operation driver are implemented to be applied cyclically through feedback control so that the driving precision may be further improved through time-series and continuous control.

The operation driver may be implemented as an independent electronic component, element, etc., but it may also be implemented as a single electronic component (chip) integrated with the Hall sensor H1 through SOC (System On Chip), etc.

In addition, the coil C1, the hall sensor H1, etc. may be mounted on a circuit board (FPCB) 140 that electrically interfaces with external modules, power supply, external devices, etc.

According to an embodiment, a plurality of carriers 120 and 130 that move linearly along the optical axis as illustrated in the drawing may be provided. The configurations described above with respect to linear movement of the carrier 120, etc., may also be applied to another carrier, that is the second carrier 130, and therefore, a detailed description thereof is omitted.

The second coil C2 illustrated in the drawing corresponds to a configuration that provides an electromagnetic force to the second driving magnet M2 (see FIG. 4) provided in the second carrier 130 to provide a driving force so that the second carrier 130 moves linearly in the optical axis direction.

Figure 3:
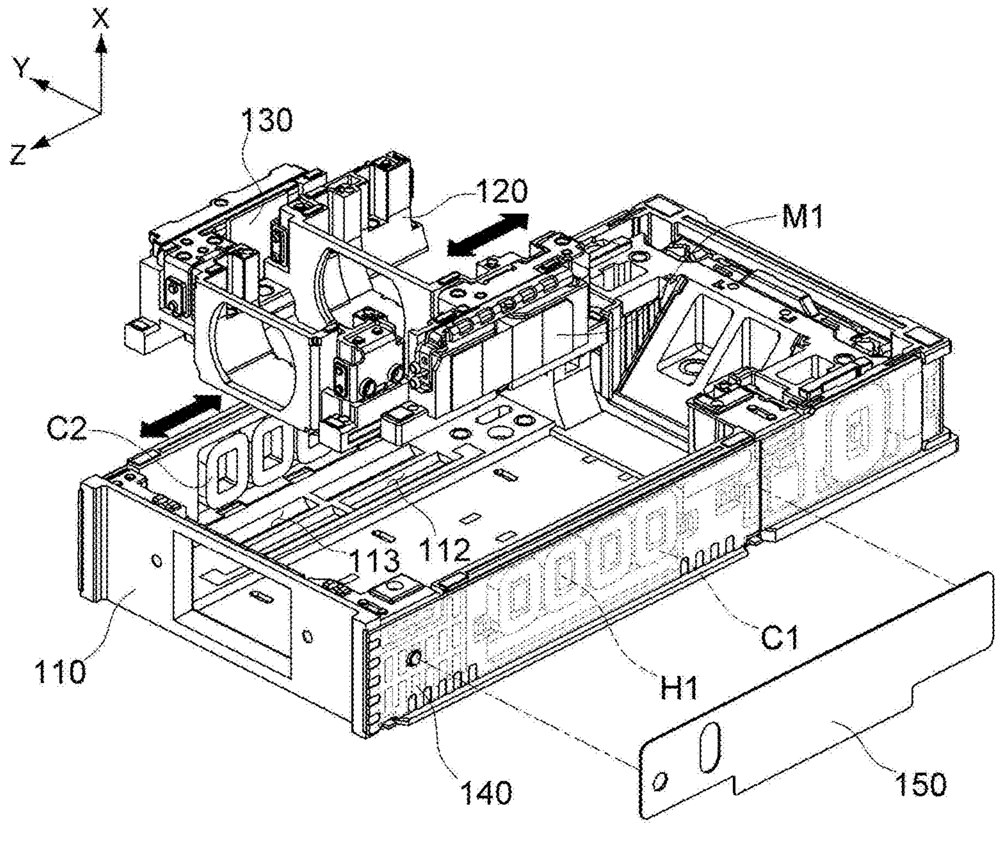
FIG. 3 is a drawing showing a carrier and its related configuration according to an embodiment of the present disclosure.
Figure 4:
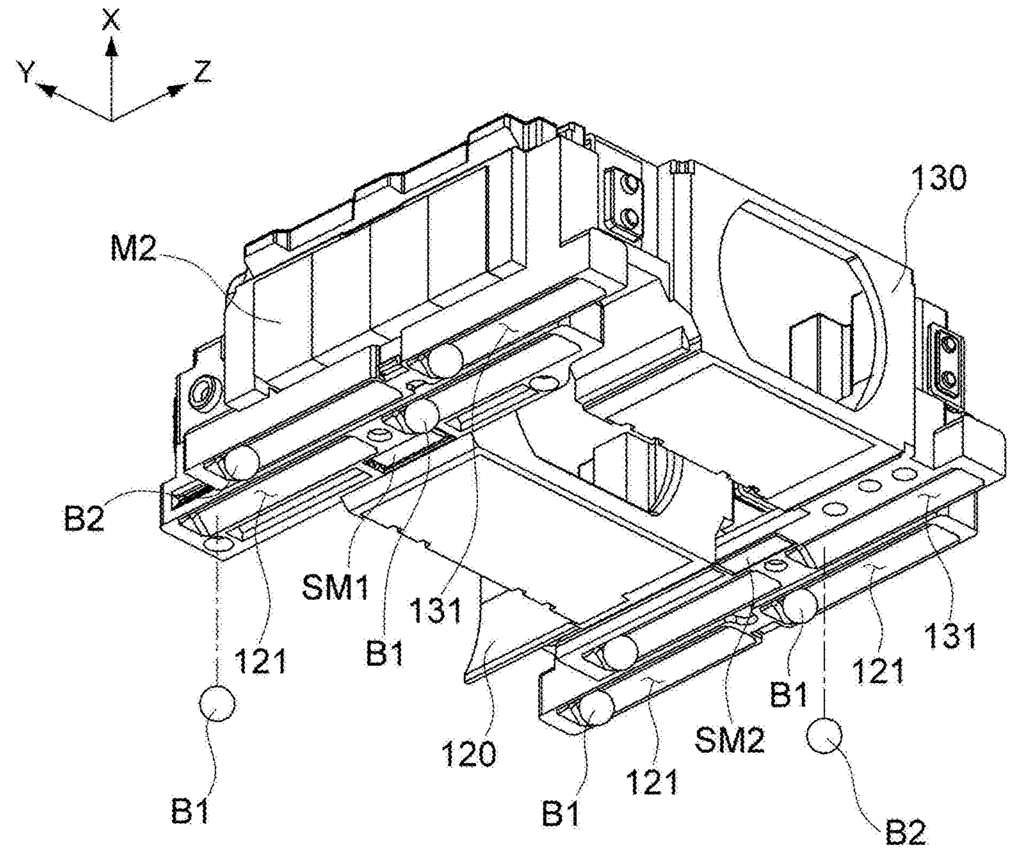
FIG. 4 is a drawing showing a detailed configuration of a carrier according to an embodiment of the present disclosure.

FIG. 3 is a drawing showing the configuration of the carriers 120 and 130 and related structures according to one embodiment of the present disclosure, and FIG. 4 is a drawing showing a detailed configuration of the carriers 120 and 130 according to one embodiment of the present disclosure.

As described above, the carrier 120 of the present disclosure is a movable body that moves linearly in the optical axis direction with respect to the housing 110 as a relatively fixed body, and a mounting space in which at least one lens is mounted is formed. The second carrier 130 is also the same.

It is desirable to place a ball B1 between the carrier 120 and the housing 110 so that the carrier 120 may move more flexibly linearly with minimized friction.

According to an embodiment, a ball B1 may be placed between a groove rail 121 provided on the lower portion of the carrier 120 and a guiding rail 112 provided on the bottom surface of the housing 110 so as to effectively induce linear movement of the carrier 120.

In this case, it is preferable that the ball B1 be configured such that a part thereof is accommodated in at least one of the groove rail 121 and/or the guiding rail 112 so that effective guiding for linear movement is implemented.

If a ball is involved in this way, the carrier 120 may move more flexibly linearly due to minimized friction caused by the ball's rolling, moving, rotation, point-contact with a facing object, etc., and there may be advantages of reduced noise, minimized driving force, and improved driving precision.

From a corresponding viewpoint, a second ball B2 is configured to be placed between the second carrier 130 and the housing 110, and may be placed between a second groove rail 131 provided on the lower portion of the second carrier 130 and a second guiding rail 113 formed on the bottom surface of the housing 110.

If the ball B1 is involved between the carrier 120 serving as a moving body and the housing 110 serving as a fixed body, in the conventional actuator, a suction magnet is separately provided in the carrier 120, and an attractive force plate made of a magnetic material (such as metal) that generates an attractive force on the suction magnet is provided in the housing 110 so that a mutual attractive force is generated. The problems of this conventional structure are as described above.

In contrast, the present disclosure does not use a suction magnet and an attractive force plate applied to a conventional actuator, but utilizes structural improvements of a driving magnet M1 essentially provided for driving a zoom, etc. and an insert plate used to enhance the durability of the housing 110, so that the contact force between the carrier

120 and the housing 110 mediated by the ball B1 is maintained. The specific configuration of the present disclosure regarding this is described in detail below.

Figure 5:
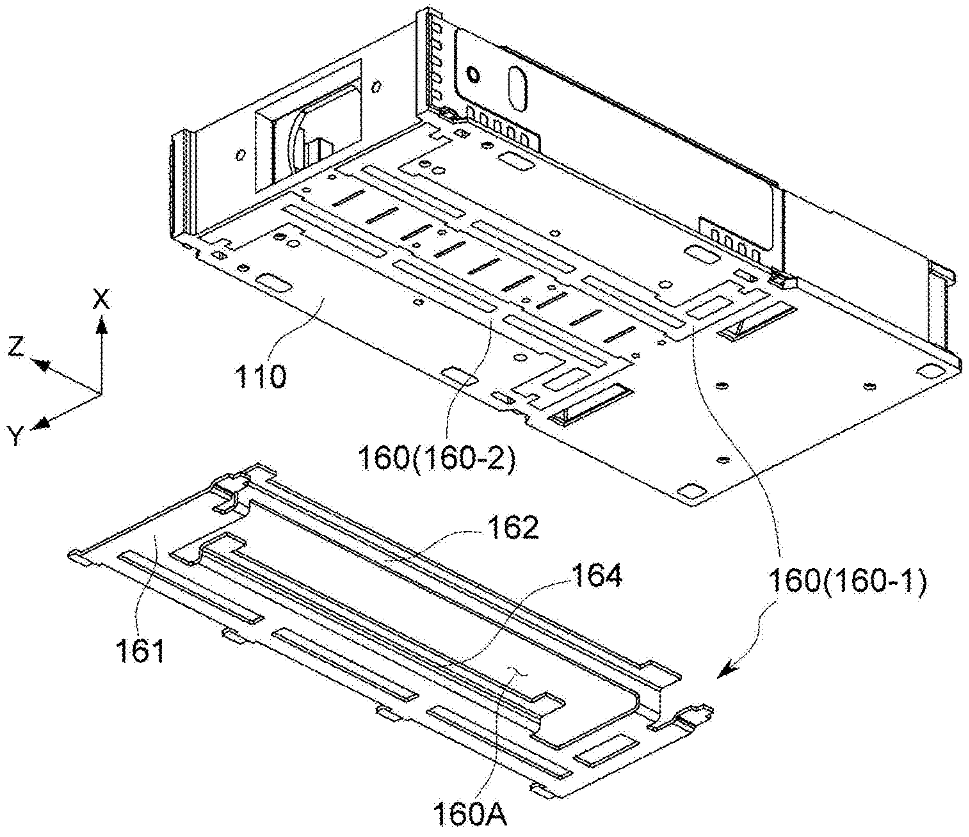
FIGS. 5 and 6 are drawings showing a detailed configuration of a reinforcing member according to an embodiment of the present disclosure.
Figure 6:
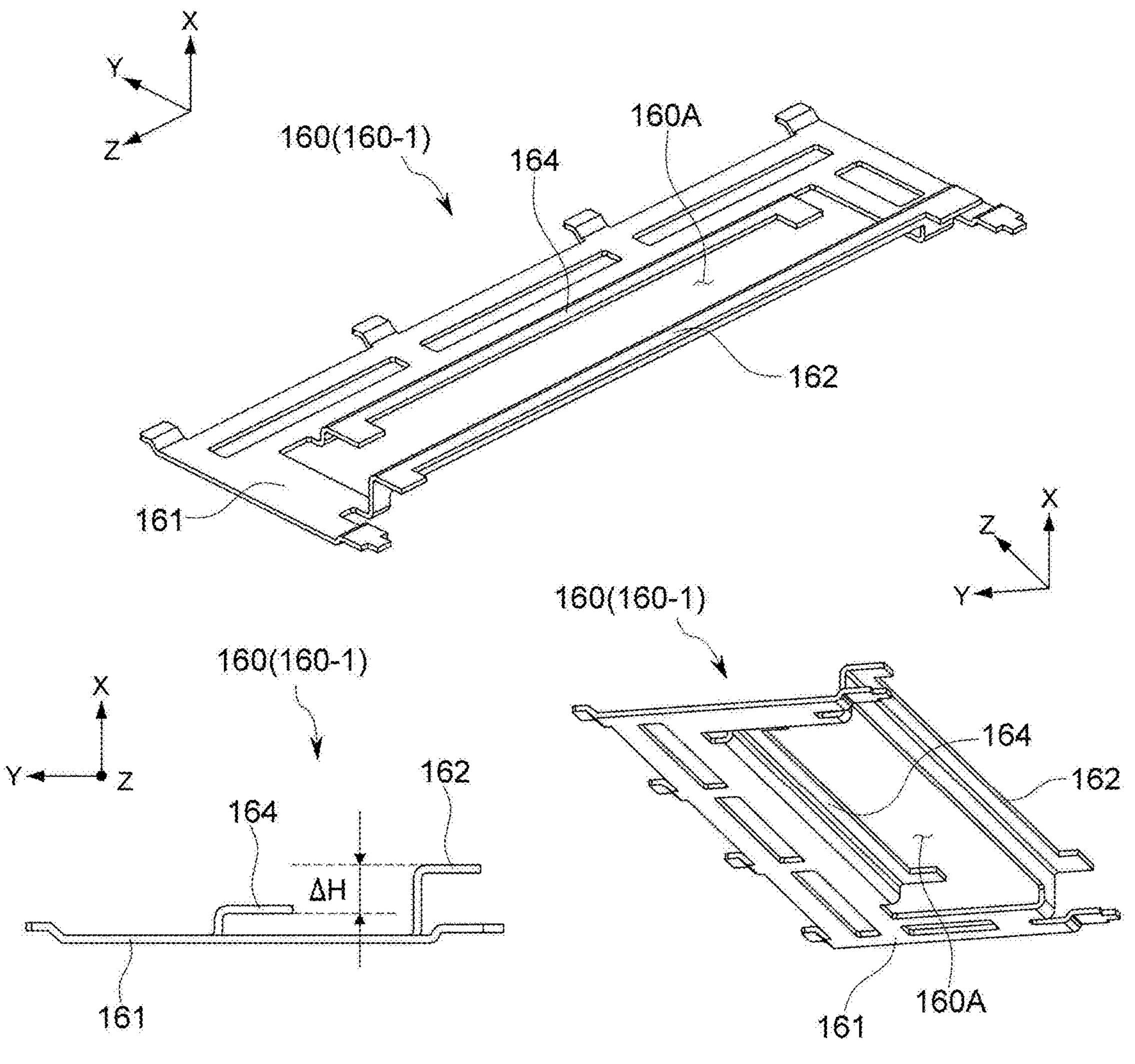

FIGS. 5 and 6 are drawings showing detailed configurations of a reinforcing member 160 according to one embodiment of the present disclosure.

In an embodiment in which a plurality of carriers moving in the optical axis direction are provided, the reinforcing member 160 of the present disclosure may be provided in plurality as illustrated in the drawing.

The reinforcing member 160 of the present disclosure is configured to correspond to an insert plate that may be generally employed in the actuator 100, and is configured to implement a function of generating an attractive force with the driving magnet M1 for driving the carrier 120, along with a basic function for enhancing durability.

It is preferable that the reinforcing member 160 of the present disclosure is made of a material having a higher strength than a plastic material that may be injection-molded, and in order to improve structural strength and increase the efficiency of the assembly process, it is preferable that the reinforcing member 160 of the present disclosure is configured to be coupled with the housing 110 through an insert injection method.

In addition, it is preferable that the reinforcing member 160 is made of a magnetic material (such as metal) so that a mutual attractive force is generated with the driving magnet M1 as described below.

Specifically, the reinforcing member 160, 160-1 of the present disclosure includes a body portion 161 and a flange portion 162, which are coupled to the lower portion of the housing 110. The body portion 161 is a configuration corresponding to the basic skeleton of the reinforcing member 160, and preferably has a shape extending in the optical axis direction as a whole, as shown in the drawing.

The flange portion 162, which is a component of the reinforcing member 160, may be formed to extend from the body portion 161 as shown in the drawing, and has a shape protruding upward (in the X-axis direction based on the drawing) toward the driving magnet M1 from the body portion 161.

Since the flange portion 162 is configured to generate an attractive force with the driving magnet M1 provided in the carrier 120, it is desirable to design the flange portion 162 to have a length (based on the optical axis direction) longer than the section (area) in which the carrier 120 can move.

It is preferable that the flange portion 162 is configured to have a shape in which the surface portion thereof protruding and bending upward from the body portion 161 to face the lower surface of the driving magnet M1 extends in the optical axis direction.

When configured in this manner, the attractive force with the driving magnet M1 may be more effectively maintained throughout the entire transfer section of the carrier 120, and the durability in the longitudinal direction of the housing 110 (optical axis direction) may also be effectively increased.

If an attractive force is generated between the driving magnet M1 provided in the carrier 120 and the reinforcing member 160 coupled to the housing 110, specifically the flange portion 162 of the reinforcing member 160 as described above, the carrier 120 mediated by the ball B1 is brought into close contact toward the housing 110, so that physical contact is effectively formed between the carrier 120 and the ball B1, as well as between the ball B1 and the housing 110.

Hereinafter, the reinforcing member 160 of the present disclosure will be described in detail based on an embodiment in which a plurality of carriers 120 moving in the optical axis direction are provided.

As illustrated in FIG. 4, a plurality of groove rails 121 on which the balls B1 are arranged may be formed on the lower portion of the carrier 120 so that linear movement of the carrier 120 may be more effectively achieved.

In this case, it is preferable that the groove rails 121 are formed at each of both sides of the carrier 120 so that the physical movement of the carrier 120 may be achieved more stably. The second groove rail 131 formed on the second carrier 130 also corresponds thereto.

As illustrated in the drawing, a moving space may be formed in each of the bodies of the carrier 120 and the second carrier 130, and the carrier 120 and the second carrier 130 may be configured to intersect each other in such a way that one of the carrier 120 and the second carrier 130 is fitted through the moving space of the other.

When configured in this way, independent movement areas for the carrier 120 and the second carrier 130 are secured, and spatial efficiency may be further increased.

When this embodiment is applied, a balance magnet SM2 may be provided on the lower portion of the second carrier 130 at an opposite side in the lower portion where the second driving magnet M2 is provided, as shown in FIG. 4. In a corresponding viewpoint, a first balance magnet SM1 may be provided on the lower portion of the lower portion of the carrier 120 at an opposite side in the lower portion where the driving magnet M1 is provided.

The balance magnet SM2 is configured to further improve the horizontality and balance of the attractive force generated between the second carrier 130 and the reinforcing member 160-1, 160-2, so there is no need to apply a large-sized magnet like the suction magnet applied in the past.

If the balance magnet SM2 is applied to the second carrier 130 in this way, the reinforcing member 160 of the present disclosure may further include a second flange portion 164 that protrudes upward from the body portion 161 toward the balance magnet SM2, as shown in FIG. 5, etc.

In addition, the second flange portion 162 is preferably configured to have a shape in which a surface portion thereof protruding and bending upward from the body portion 161 to face the lower surface of the balance magnet SM2 extends in the optical axis direction parallel to the flange portion 162.

If the flange portion 162 and the second flange portion 164 are included together in the reinforcing member 160 in this way, the reinforcing member 160 of the present disclosure is configured to generate an attractive force with the driving magnet M1 provided in the carrier 120 through the flange portion 162 and to generate an attractive force with the balance magnet SM2 provided in the second carrier 130 through the second flange portion 164.

That is, the reinforcing member 160 of the present disclosure implements heterogeneous functions of generating a main attractive force and generating an attractive force for balance, and furthermore, the reinforcing member 160 is configured to generate attractive forces with both the carrier 120 and the second carrier 130, which are different physical objects, through a single configuration.

In this case, as illustrated in the lower part of FIG. 6, it is preferable that the flange portion 162 and the second flange portion 164 have different heights (ΔH) based on the direction (the X-axis direction based on the drawing) perpendicular to the optical axis so as to suppress interference of attractive forces due to mutual magnetic force and to more effectively induce independent physical movements of the carrier 120 and the second carrier 130.

The body portion 161, the flange portion 162, and the second flange portion 164 of the reinforcing member 160 of the present disclosure may be formed integrally by means of press processing, etc., of course.

Figure 7:
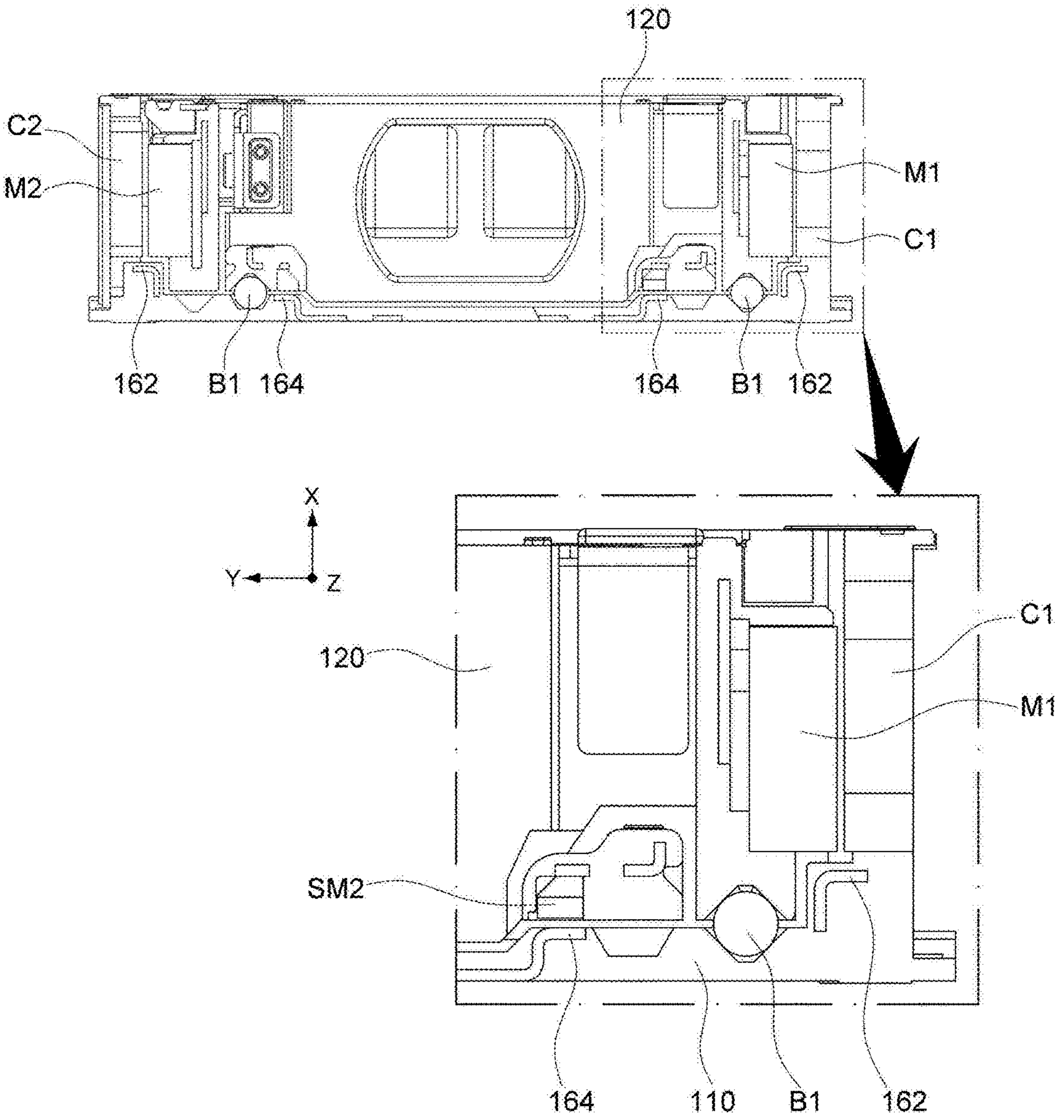
FIGS. 7 and 8 are drawings showing the mutual relationship between the driving magnet and the reinforcing member.
Figure 8:
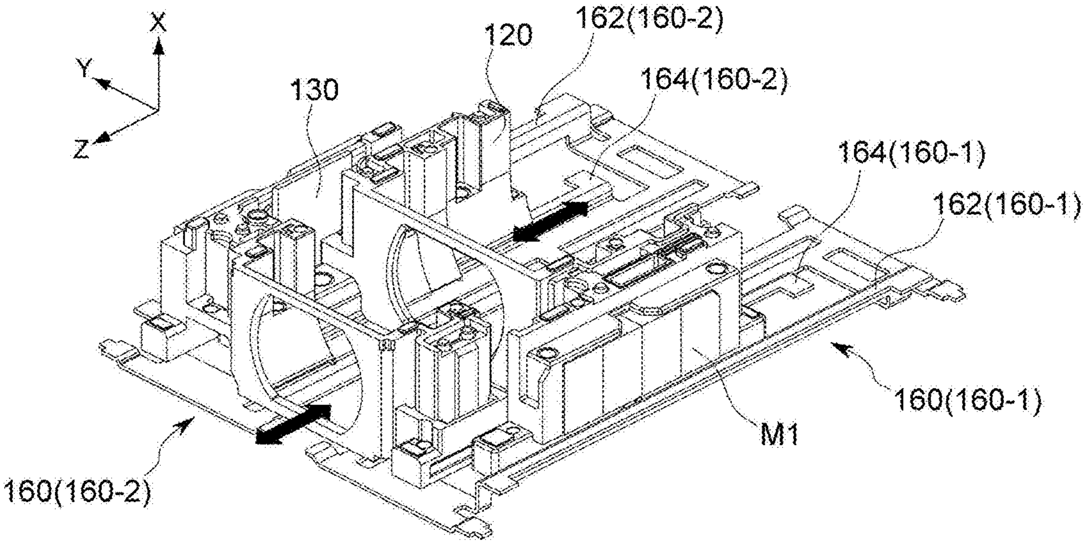
Figure 8:
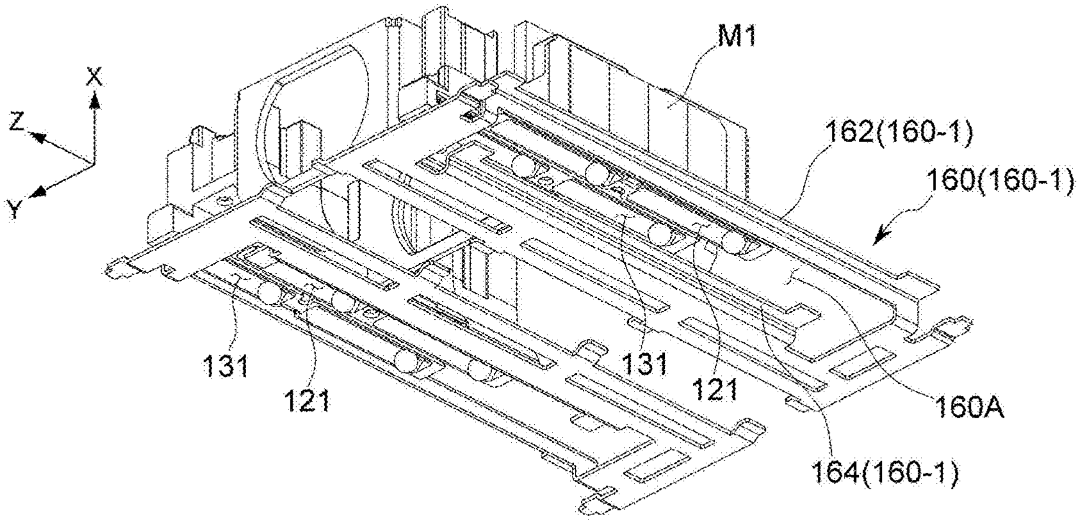

FIGS. 7 and 8 are drawings showing the mutual relationship between the driving magnet M1 and the reinforcing member 160.

If the reinforcing member 160 of the present disclosure is applied, the flange portion 162 faces the driving magnet M1 throughout the entire section in which the carrier 120 moves in the optical axis direction, so that the contact force between the carrier 120 and the housing 110 may be constantly maintained by the attractive force between the driving magnet M1 and the flange portion 162.

Also, the first balance magnet SM1 (see FIG. 4) provided in the carrier 120 generates an attractive force with the second flange portion 164 of the second reinforcing member 160-2 that generates an attractive force with the second driving magnet M2 provided in the second carrier 130.

As shown in FIG. 7, with respect to the reinforcing member 160, the flange portion 162 of the reinforcing member 160 generates an attractive force with the driving magnet M1 provided in the carrier 120, and the second flange portion 164 generates an attractive force with the balance magnet SM2 provided in the second carrier 130.

That is, the ball B1 is interposed between the carrier 120 and the housing 110, and the carrier 120 moves linearly in the optical axis direction while being stably maintained in close contact with the housing 110 by the flange portion 162 of the reinforcing member 160-1 and the second flange portion 164 of the second reinforcing member 160-2.

In addition, in a state where the second ball B2 is interposed between the second carrier 130 and the housing 110, the second carrier 130 moves linearly in the optical axis direction stably in close contact toward the housing 110 by the flange portion 162 of the second reinforcing member 160-2 and the second flange portion 164 of the reinforcing member 160-1.

As described above, the housing 110 may include a guiding rail 112 along which the ball B1 is guided and/or a second guiding rail 113 along which the second ball B2 is guided.

In this case, it is desirable that the flange portion 162 and the second flange portion 164 are arranged side by side to be spaced apart from each other by an appropriate interval so that the guiding rail 112 and/or the second guiding rail 113 are located in the space between the flange portion 162 and the second flange portion 164 of the reinforcing member 160.

When the guiding rail 112 and/or the second guiding rail 113 are arranged in the space between the flange portion 162 and the second flange portion 164 of the reinforcing member 160, as shown in FIG. 8, the groove rail 121 of the carrier 120 facing the guiding rail 112 or the second groove rail 131 of the second carrier 130 facing the second guiding rail 113 is positioned in the space between the flange portion 162 and the second flange portion 164.

When configured in this manner, spatial utilization for both the configuration in which the attractive force is generated and the configuration in which the physical movement of the carrier is guided may be implemented more effectively.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a camera, comprising:
- a carrier having a lens mounted thereon, the carrier configured for moving in an optical axis direction;
- a housing accommodating the carrier;
- a driving magnet provided in the carrier;
- a coil provided in the housing and facing a side portion of the driving magnet;
- a ball arranged between a lower portion of the carrier and the housing; and
- a reinforcing member coupled to the housing, the reinforcing member configured for generating an attractive force with the driving magnet, the reinforcing member comprising:
  - a body portion coupled to a lower portion of the housing; and
  - a flange portion protruding upward from the body portion toward the driving magnet.

2. The actuator for a camera according to claim 1, wherein the flange portion has a shape in which a surface portion thereof protruding and bending upward from the body portion to face a lower surface of the driving magnet extends in the optical axis direction.

3. The actuator for a camera according to claim 1, further comprising:
- a second carrier having a lens mounted thereon, the second carrier configured for moving in the optical axis direction;
- a second driving magnet provided on the second carrier;
- a balance magnet provided on a lower portion of the second carrier, the balance magnet being provided on the lower portion at an opposite side where the second driving magnet is provided;
- a second coil provided in the housing and facing a side portion of the second driving magnet; and
- a second ball arranged between the lower portion of the second carrier and the housing;
- wherein the reinforcing member includes a second flange portion protruding upward from the body portion toward the balance magnet.

4. The actuator for a camera according to claim 3, wherein the flange portion has a shape in which a surface portion thereof protruding and bending upward from the body portion to face a lower surface of the driving magnet extends in the optical axis direction, and
- wherein the second flange portion has a shape in which a surface portion thereof protruding and bending upward from the body portion to face a lower surface of the balance magnet extends in the optical axis direction parallel to the flange portion.

5. The actuator for a camera according to claim 4, wherein the flange portion and the second flange portion have different heights relative to a direction perpendicular to an optical axis.

6. The actuator for a camera according to claim 5, wherein the housing includes a first guiding rail on which the ball is guided or a second guiding rail on which the second ball is guided, and wherein the first guiding rail or the second guiding rail is formed in a space between the flange portion and the second flange portion.

* * * * *